United States Patent
Taketsuna et al.

(10) Patent No.: US 7,125,361 B2
(45) Date of Patent: Oct. 24, 2006

(54) TOROIDAL TYPE CONTINUOUSLY VARIABLE TRANSMISSION

(75) Inventors: Yasuji Taketsuna, Okazaki (JP); Shigenori Tamaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 214 days.

(21) Appl. No.: 10/433,010

(22) PCT Filed: Dec. 12, 2001

(86) PCT No.: PCT/JP01/10881

§ 371 (c)(1),
(2), (4) Date: May 29, 2003

(87) PCT Pub. No.: WO02/48578

PCT Pub. Date: Jun. 20, 2002

(65) Prior Publication Data

US 2004/0033860 A1  Feb. 19, 2004

(30) Foreign Application Priority Data

Dec. 13, 2000  (JP) .............................. 2000-378899

(51) Int. Cl.
*F16H 15/38* (2006.01)
(52) U.S. Cl. ....................................................... 476/40
(58) Field of Classification Search .................... 476/8, 476/10, 40, 42, 46, 1, 2, 57
See application file for complete search history.

(56) References Cited

U.S. PATENT DOCUMENTS

| | | | | |
|---|---|---|---|---|
| 864,081 A | * | 8/1907 | Coombs | 476/1 |
| 4,281,559 A | | 8/1981 | Sharpe | |
| 4,576,055 A | * | 3/1986 | Kraus | 476/8 |
| 5,316,526 A | * | 5/1994 | Fellows | 476/10 |
| 5,423,727 A | * | 6/1995 | Fellows | 476/40 |
| 5,971,886 A | * | 10/1999 | Yamamoto | 476/10 |
| 5,989,150 A | * | 11/1999 | Yamamoto | 476/8 |
| 6,464,614 B1 | * | 10/2002 | Dutson | 476/10 |
| 2001/0001933 A1 | * | 5/2001 | Dutson | 74/388 PS |

FOREIGN PATENT DOCUMENTS

| | | |
|---|---|---|
| DE | 2 236 589 | 2/1973 |
| DE | 27 36 553 A1 | 2/1978 |
| DE | 197 47 694 A1 | 5/1998 |
| GB | 1 395 319 | 5/1975 |
| JP | A 4-502954 | 5/1992 |
| JP | A 8-135746 | 5/1996 |
| JP | 9-119506 | * 5/1997 |
| JP | A 10-132044 | 5/1998 |
| JP | A 10-132047 | 5/1998 |

* cited by examiner

OTHER PUBLICATIONS

Merriam-Webster's Collegiate Dictionary, tenth edition, p. 586, 1997.*

*Primary Examiner*—William C. Joyce
(74) *Attorney, Agent, or Firm*—Oliff & Berridge, PLC

(57) ABSTRACT

A toroydal type continuously variable transmission wherein a rollers is clamped in a rotatable condition by the input disc and the output disc arranged rotatably on the common axis line and opposed to each other; wherein an actuator for moving the roller backward and forward in the direction along a plane vertical to a center axis of rotation of those discs is provided; and wherein those discs, roller, and actuator are accommodated inside of the housing; and an installation portion protruding to the center portion of the housing is provided on inner face of the housing and the said actuators are fixed on the installation portion.

7 Claims, 5 Drawing Sheets

TOROIDAL TYPE CONTINUOUSLY VARIABLE TRANSMISSION

TECHNICAL FIELD

This invention relates to a toroidal type (or traction type) continuously variable transmission which is constructed with clamping rollers for mediating the transmission of a torque between a rolling face of an input disc and a rolling face of an output disc opposed to each other, in order to transmit a torque between the individual discs through the rollers.

BACKGROUND ART

A continuously variable transmission of this kind is constructed with, e.g., clamping a disc-shaped rollers between a pair of discs arranged opposed to each other. The portion of the pair of discs where is the outer side from a predetermined radius has an arcuate plane congruent with the arc centered on the center points of opposed planes of those discs, and such arcuate planes is leading to circumferential direction. The plane thus incurved three-dimensionally is a toroidal plane. The toroidal plane functions as a rolling face and the rollers is clamped therebetween. The roller is a disc-shaped member and its sectional figure along the in-depth direction of the outer circumferential portion is congruent with the arcuate figure of the rolling face of the discs. Accordingly, the roller is rotated by means of rotating one of the discs, and the other disc rotates sequentially. Then, the roller is inclined to move the radial position of the contact portion against one of the discs, i.e., the radial position from the center axis of the disc outward, and also to move the radial position of the contact portion against the other disc to inner circumferential side, so that the gear ratio corresponding to the proportion of the radii of each contact portions is accordingly set.

Toroidal type continuously variable transmission is categorized into full-toroidal type and half-toroidal type according to the configuration of their toroidal plane. The former mentioned full-toroidal type continuously variable transmission has the toroidal plane on its disc, which is formed to make the clearance between the toroidal planes opposed to each other broader outwards in the radius direction gradually, and then to make the clearance narrower gradually. On the other hand, latter mentioned half-toroidal type continuously variable transmission has a toroidal plane on its disc whose configuration is half shape of said full-toroidal type, and the clearance between the toroidal faces opposed to each other is widest at the outer circumferential side of the discs.

In any of those types of continuously variable transmissions, roller is clamped between a pair of discs, and the pressure is set with corresponding to the torque to be transmitted. Also, the contact face of the disc and the roller with an oil film being interposed therebetween is not flat a plane, therefore, the load to change the posture acts on the roller. For example, in the former mentioned full-toroydal type continuously variable transmission, the load for inclining the rollers is generated in connection with the movement of the roller backward and forward by means of supporting the roller with so-called caster angle. On the contrary, in the half-toroidal type continuously variable transmission, because the rolling face of the disc open to outer circumferential side, the thrust load for pressing the roller outwardly in a radial direction is generated by clamping the roller with the discs.

In this connection, full-toroidal type continuously variable transmission is constructed to execute the speed change with utilizing the load which acts to incline the aforementioned roller. One example of such is disclosed in Japanese Patent Laid-Open No. 10-132047. To describe specifically, a roller clamped between a pair of discs is held by a support member in a rotatable condition, and the support member is connected to a piston rod of a hydraulic cylinder. The hydraulic cylinder is arranged with being inclined in a horizontal direction in order to set the predetermined caster angle to the vertical plane against the center axis of the discs.

Accordingly, the roller is moved between the discs backward and forward in connection with the movement of a piston rod of the hydraulic cylinder backward and forward, so that the roller is inclined against the center axis of the discs with corresponding to its anteroposterior position. Consequently, the position of the contact portion of the roller against the input disc in the radius direction and the position of the contact portion of the roller against the output discs are differed each other; therefore, the gear ratio which corresponds to the proportion of distance between those contact portion and the center axis of the discs is accordingly set.

In the full-toroydal type continuously variable transmission, as mentioned above, an actuator such as a hydraulic cylinder for executing speed change by means of moving the roller backward and forward is arranged with leading to the direction having a predetermined angle of inclination against the plane vertical to the center axis of the discs, from between the input disc and the output disc. On the other hand, the input disc and the output disc are arranged collinearly and the roller is clamped between those discs, so that the housing space for the discs and the roller may be cylindrical space.

Thus, the way of arrangement of discs and rollers, and the way of arrangement of the actuators for moving the rollers forward and backward are different; and moreover, a plurality of rollers is arranged in the circumferential direction of the discs with keeping constant distance; so that a plurality of actuators has to be arranged with protruding from arrangement space for the discs and so on in the radius direction.

In order to support such actuators, for instance, it is considerable to form a plurality of cylindrical shaped protrusion on the outer circumferential wall portion of the housing of continuously variable transmission, and to accommodate actuators in such protrusions. However, if it is constructed as such and employed as a speed change device for a vehicle, mountability becomes worse because the structure has to be complicated due to big convexes and concaves, and the requirement for down sizing and weight saving cannot be fulfilled accordingly. Moreover, productivity also becomes worse because a plurality of core and sand cast have to be employed for casting a housing.

Furthermore, the specifications such as length of oil passages and so on have to be unified when the oil pressure is fed to each actuators, because rollers arranged in the circumferential direction with keeping constant distance have to exhibit the identical behavior simultaneously to execute speed change. However, in the aforementioned structure in which a plurality of actuators is held with being protruded from the housing in the radius direction, the structure of piping to the actuators becomes complicated. Consequently, there are disadvantages such as lag in the action timing between individual actuator and so on.

This invention has been conceived noting the aforementioned technical problem and has an object to provide a toroidal type continuously variable transmission which can simplify its outer shape and the arrangement of oil passages for lubrication oil and hydraulic for control.

DISCLOSURE OF THE INVENTION

In order to achieve the aforementioned object, the present invention is characterized by being constructed to fix an actuator for moving said roller, or to feed an oil pressure with utilizing an installation portion and a wall portion for accommodating input discs, output discs, and rollers clamped by those discs, which are formed inside of a housing with protruding from inner face to a center portion of the housing. Specifically, according to the present invention, there is provided a toroidal type continuously variable transmission wherein the roller is clamped in a rotatable condition by the input disc and the output disc arranged rotatably on the common axis line and opposed to each other; wherein the actuator for moving the roller backward and forward in the direction along the plane vertical to the center axis of rotation of those discs is provided; and wherein each of those discs, rollers, and actuators are accommodated inside of the housing; and an installation portion protruding to the center portion of the housing is provided on the inner face of said housing whereby said actuators are fixed thereon.

Accordingly, in the present invention, the roller is rotated by means of rotating the input disc, then, the output disc turns in connection, and the torque is transmitted between the input disc and the output disc as a result. Also, if the roller is moved by the actuator backward and forward when the torque is being transmitted, the roller is inclined to lean its rotating face against the center axis of rotation of each discs. Consequently, radial position of the contact portion between the roller and the input disc and radial position of the contact portion between the roller and the output disc are varied, and speed change is thereby executed. The actuator is fixed on the installation portion arranged inside of the housing with protruding to the center portion; therefore, portions protruding outwardly are eliminated or reduced on the housing, and entire profile of the continuously variable transmission is simplified.

Moreover, in the present invention, the installation portion may be formed as a wall portion; an oil passage is formed inside of the wall portion, and the port to be communicated with said oil passage is formed on the plane where the actuator is to be fixed. Also, another port to be communicated with said port under the state that the actuator is fixed on the wall portion is formed on the position which corresponds to said port on the fixing plane of the actuator against the wall portion.

With this construction, accordingly, when a hydraulic pressure is fed to the oil passage formed on the installation portion or the wall portion, the hydraulic pressure is fed to the actuator side through the port formed on the wall portion and through the port of the actuator formed on the position which corresponds to said port. Therefore, it is unnecessary to arrange pipelines for feeding and draining hydraulic pressure, and entire construction of the continuously variable transmission may be simplified and compacted. Furthermore, the oil passage may be arranged inside of the housing and the wall portion as those are manufactured, so that the manufacturing and assembling works of the continuously variable transmission become easy.

BEST MODE FOR CARRYING OUT THE INVENTION

Figure 1:
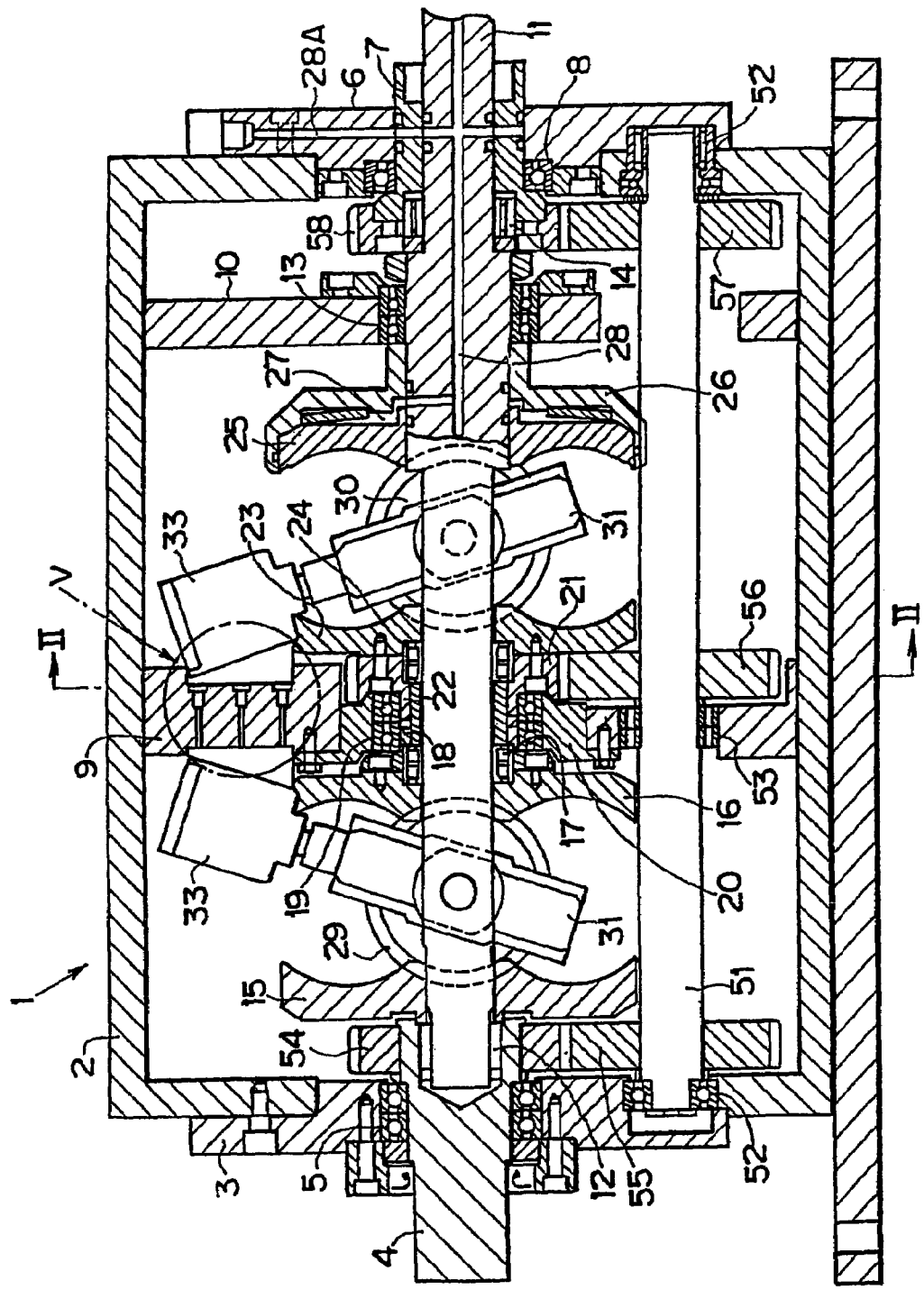
FIG. 1 is a side sectional view showing one example of a continuously variable transmission according to this invention.
Figure 2:
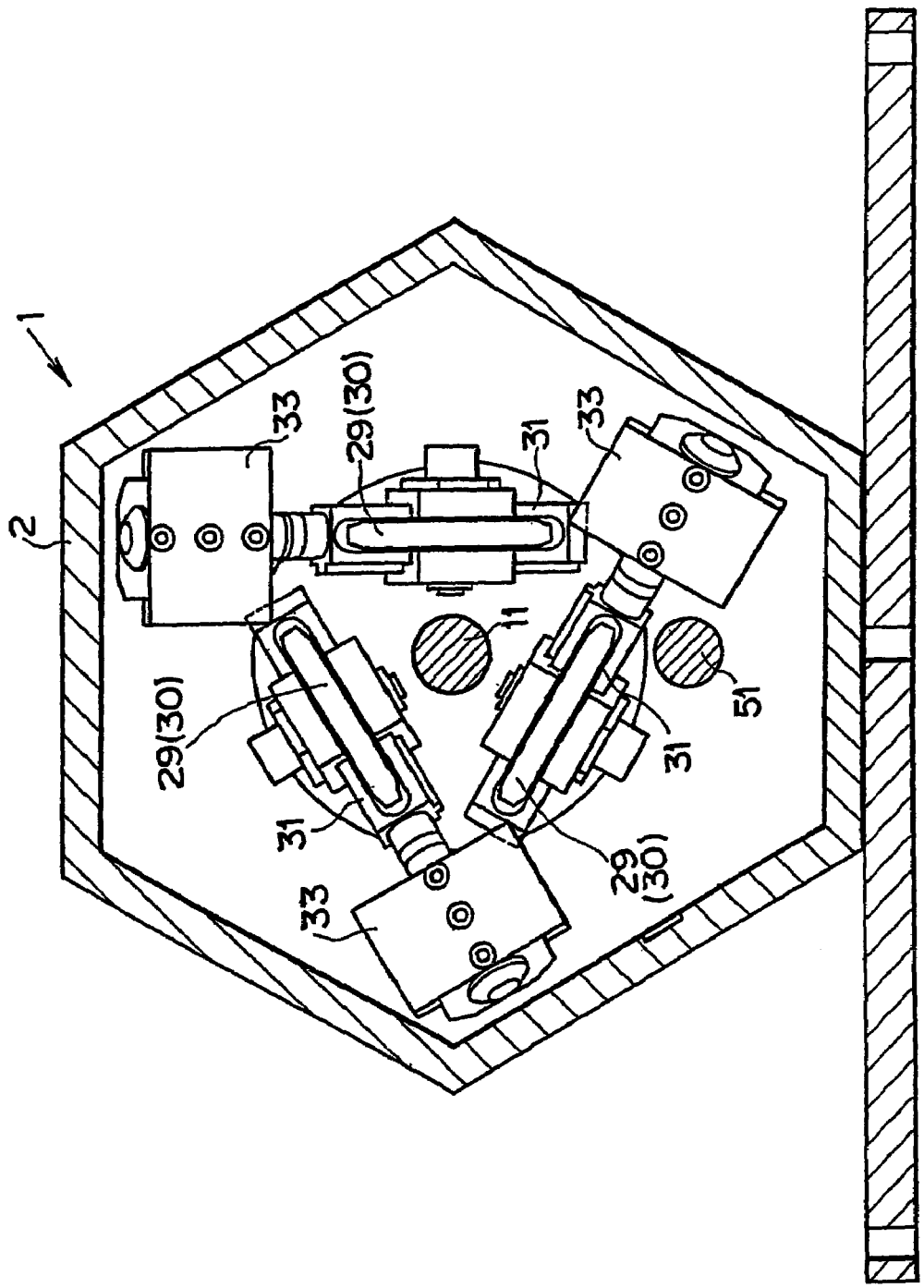
FIG. 2 is a partially omitted front sectional view along the line II—II in the FIG. 1.

Next, this invention will be described in connection with a specific embodiment with reference to the drawings. FIG. 1 is a sectional view shows one example of the present invention, and a double cavity type full-toroydal continuously variable transmission 1 is depicted therein. The continuously variable transmission 1 as a whole is accommodated in the housing 2. The housing 2 is structured cylindrically and hollowly, and its sectional configuration is hexagonal in this example, as shown in FIG. 2.

An input shaft 4 is arranged with penetrating the center portion of an end plate 3 as one of the end plates of the housing 2, and is held by the end plate 3 through a bearing 5. Also, a cylindrical shaft 7 is arranged with penetrating the center portion of another end plate 6, and is held by the end plate 6 through a bearing 8. Moreover, an intermediate plate 9 protruding from the inner face to the center portion, i.e., the intermediate plate 9 functions as a wall portion for dividing interior portion of the housing 2 in the axial direction generally in two is provided at the intermediate portion of the housing 2 in the axial direction. Furthermore, a supporting plate 10 having an almost identical shape as the intermediate plate 9 is provided at the position near the end plate 6 of output side.

A leading end portion of the input shaft 4, i.e., an end portion protruding to inside of the housing 2 is formed hollowly, and one of the end portion of an output shaft 11 is fitted into the hollow portion through a bearing 12 in a rotatable condition. The output shaft 11 penetrates the intermediate plate 9 and the supporting plate 10, and protrudes to exterior portion of the housing 2 from the side of another end plate 6 through inside of the cylindrical shaft 7. Moreover, the output shaft 11 is held in a rotatable condition by a bearing 13 being interposed at the penetrating portion of the supporting plate 10, and by a bearing 14 arranged on inner circumferential side of the cylindrical shaft 7.

A first output disc 15 is fitted with the leading end portion of the output shaft 11, i.e., in the vicinity of end portion being fitted with the input shaft 4 through a spline or the like, and those are allowed to rotate integrally. A first input disc 16 as a counterpart of the first output disc 15 is arranged in the position close to the intermediate plate 9 with being opposed to the first output disc 15. The output shaft 11 penetrates the first input disc 16, and a bearing 17 for making the relative rotation smooth is arranged between the output shaft 11 and the first input disc 16.

A bearing 19 is fitted with the outer circumference of a boss portion 18 arranged on the backside of the first input disc 16. And the bearing 19 is held by a bearing holder 20 fitted with the center portion of the intermediate plate 9. Namely, the first input disc 16 is held by the intermediate plate 9.

Also, an input gear 21 is arranged on the opposite side of the first input disc 16 across said bearing holder 20. A boss portion 22 formed integrally with the input gear 21 leads to the side of the boss portion 18 of the first input disc 16, and those boss portions 22 and 18 are engaged to rotate integrally. In short, the first input disc 16 and the input gear 21 are connected. Moreover, the boss portion 22 of the input gear 21 is fitted with another bearing 19 held by the bearing holder 20, and the input gear 21 is accordingly held by the intermediate plate 9.

A second input disc 23 having an identical shape as the first input disc 16 is arranged on the opposite side of the bearing holder 20 across the input gear 21, i.e., the opposite side of said first input disc 16 across the intermediate plate 9. The second input disc 23 is connected to the input gear 21 tightly and integrally. And a bearing 24 is arranged on the inner circumference of the input gear 21 and the second input disc 23, for holding the output shaft 11 penetrating therethrough.

A second output disc 25 as a counterpart of said second input disc 23 is arranged with being opposed to the second input disc 23, and splined with the output shaft 11 penetrating center portions of those. On the backside of the second output disc 25, i.e., between the second output disc 25 and the supporting plate 10, there is arranged a cylinder member 26 for covering the backside and outer circumferential face of the second output disc 25 liquid tightly. A hydraulic chamber 27 is formed between the cylinder member 26 and the second output disc 25. Also, the cylinder member 26 abuts in the axial direction against the bearing 13 fitted with the inner circumferential portion of the supporting plate 10, and the position of the cylinder member 26 in the axial direction is restricted. Accordingly, the second output disc 25 is thrust to the side of the second input disc 23 by means of feeding an oil pressure to the hydraulic chamber 27.

An oil passage 28 for feeding and draining an oil pressure to the hydraulic chamber 27 is formed with penetrating the center portion of the output shaft 11. The oil passage 28 opens not only to the outer circumferential face of the output shaft 11 at the position corresponding to the hydraulic chamber 27, but also to the outer circumferential face of the output shaft 11 at the position corresponding to the end plate 6, and communicates with the feeding oil passage 28A formed on the end plate 6.

Each of aforementioned input discs 16 and 23, and output discs 15 and 25 are so formed to have its rolling face functions as a toroidal plane, likewise the discs of full toroidal type continuously variable transmission according to the prior art. That is to say, the rolling face is so shaped to have its sectional shape along the plane passes through the center axis as an arc which has a constant radius, and the intermediate portion between inner circumferential portion and the outer end circumferential portion is the most sunken (receded) portion. In other words, the widest clearance between the rolling faces of the input discs 16 and 23, and the output discs 15 and 25 opposed each other is the intermediate portion between the inner circumferential portion and the outer end circumferential portion.

Moreover, three of each power rollers 29 and 30 are arranged between the first input disc 16 and the output disc 15, and between the second input disc 23 and the output disc 25 respectively, in a circumferential direction with keeping constant clearance, i.e., clearance with 120 degrees.

Those power rollers 29 and 30 are disc-shaped members, and the outer circumferences of those has a sectional shape formed into curved face with a curvature equal to that of the arc of the rolling face of each disc 15, 16, 23, and 25. As the power rollers 29, 30 are inclined with respect to the individual discs 15, 16, 23 and 25, therefore, radial portions of the contact portions between the power rollers 29 and 30, and the discs 15, 16, 23, and 25 are arbitrarily changed.

Figure 3:
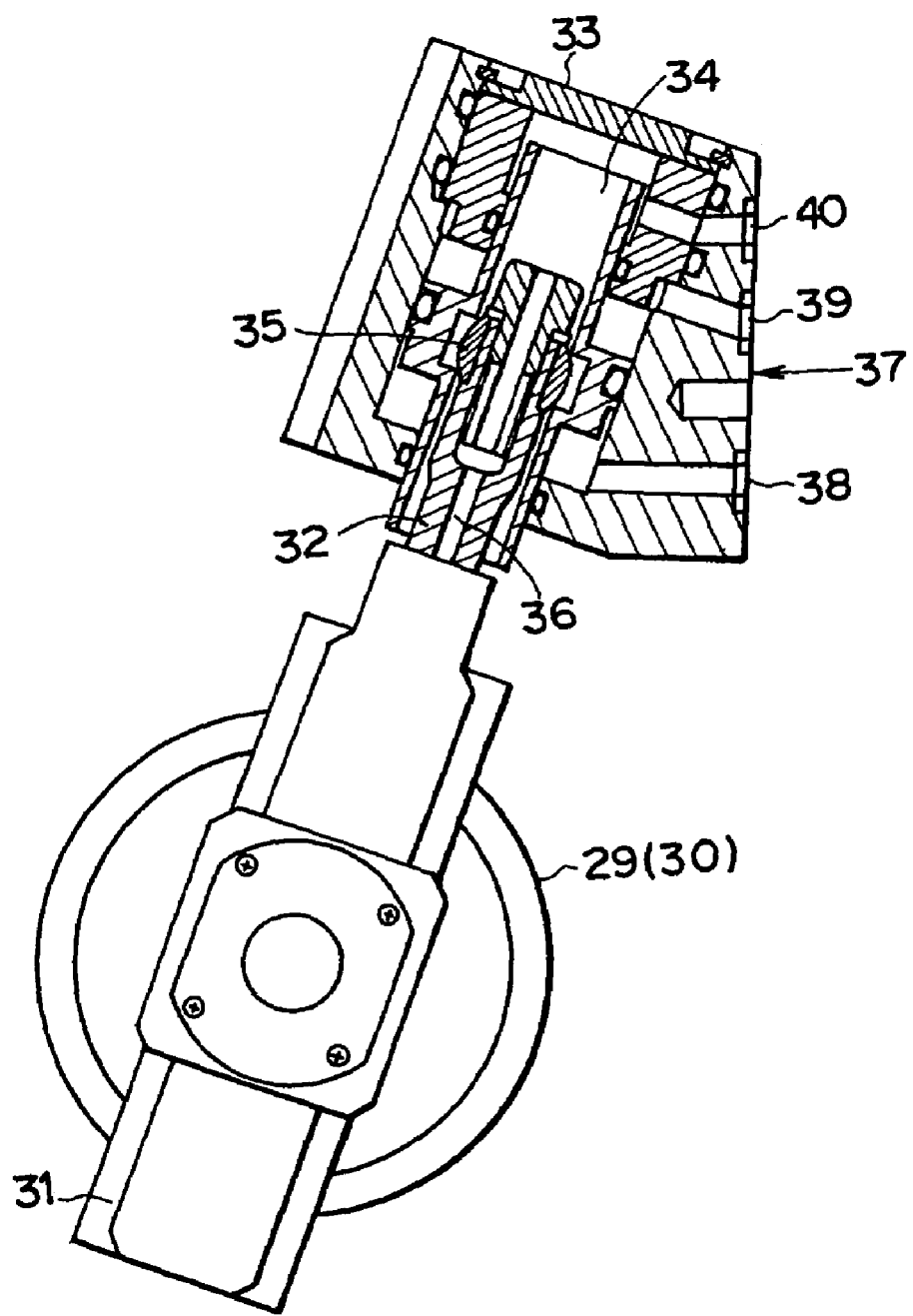
FIG. 3 is a sectional view showing one example of a hydraulic cylinder for moving a power roller backward and forward.

Moreover, each power roller 29 and 30 is held rotatably and inclinably by the carriage 31 acting as a holding member. As shown in FIG. 1 and FIG. 3, the carriage 31 is a member which is constructed of two of plate shaped portions upper and lower, for holding the power rollers 29 and 30 by clamping, with holding a shaft provided on the center portions of the power rollers 29 and 30 protruding to both directions upward and downward rotatably. A shaft portion 32 provided on one of the end portions in a longitudinal direction of the carriage 31 is connected to a piston rod 34 of a linear acting type hydraulic cylinder 33 through a ball joint 35.

Namely, the piston rod 34 of the hydraulic cylinder 33 is a hollow cylindrical shaft member integrated with the piston, as depicted in FIG. 3, and the shaft portion 32 is inserted therein. Also, the shaft portion 32 and the piston rod 34 are connected allowably to oscillate through the ball joint 35 fitted on the outer circumferential portion of the shaft portion 32.

A lubricating oil passage 36 is formed along the center axis of the shaft portion 32 integrated with the carriage 31. The function of the lubricating oil passage 36 is feeding the lubricating oil to the outer circumferential face of the power rollers 29 and 30, and it opens to the portion opposed to outer circumferential face of the power rollers 29 and 30 in the carriage 31. Also, the rear end portion of the lubricating oil passage 36 is communicated to the hollow portion of the rear end side of the hydraulic cylinder 33, likewise the piston rod 34.

A portion of exterior wall face of the hydraulic cylinder 33, i.e., an installation face 37 against the intermediate plate 9 is inclined with predetermined angle to the moving direction of the piston rod 34, i.e., center axis of the hydraulic cylinder 33. This angle of the gradient is identical to a caster angle of the power rollers 29 and 30, and in case of installing the hydraulic cylinder 33 on the side face of the intermediate plate 9, the center axes of the carriage 31 and the hydraulic cylinder 33 are inclined to the plane vertical to the center axis of the output shaft 11. As a result, the caster angle is accordingly set. Besides, the caster angle of the power roller 29 to be clamped between the first input disc 16 and the output disc 15, and caster angle of the power roller 30 to be clamped between the second input disc 23 and the output disc 25 are identical, and those angles of inclination are transversally antithetical.

Moreover, a reverse port 38 for feeding the oil pressure to draw the piston in a backward, a forward port 39 for feeding the oil pressure to forward the piston, and a lubrication port 40 for feeding the lubricating oil to said lubricating oil passage 36 are formed on the installation face 37 of the hydraulic cylinder 33. Besides, those ports 38, 39, and 40 are arranged linearly in the listed order from the side of the leading end portion of the hydraulic cylinder 33.

Figure 4:
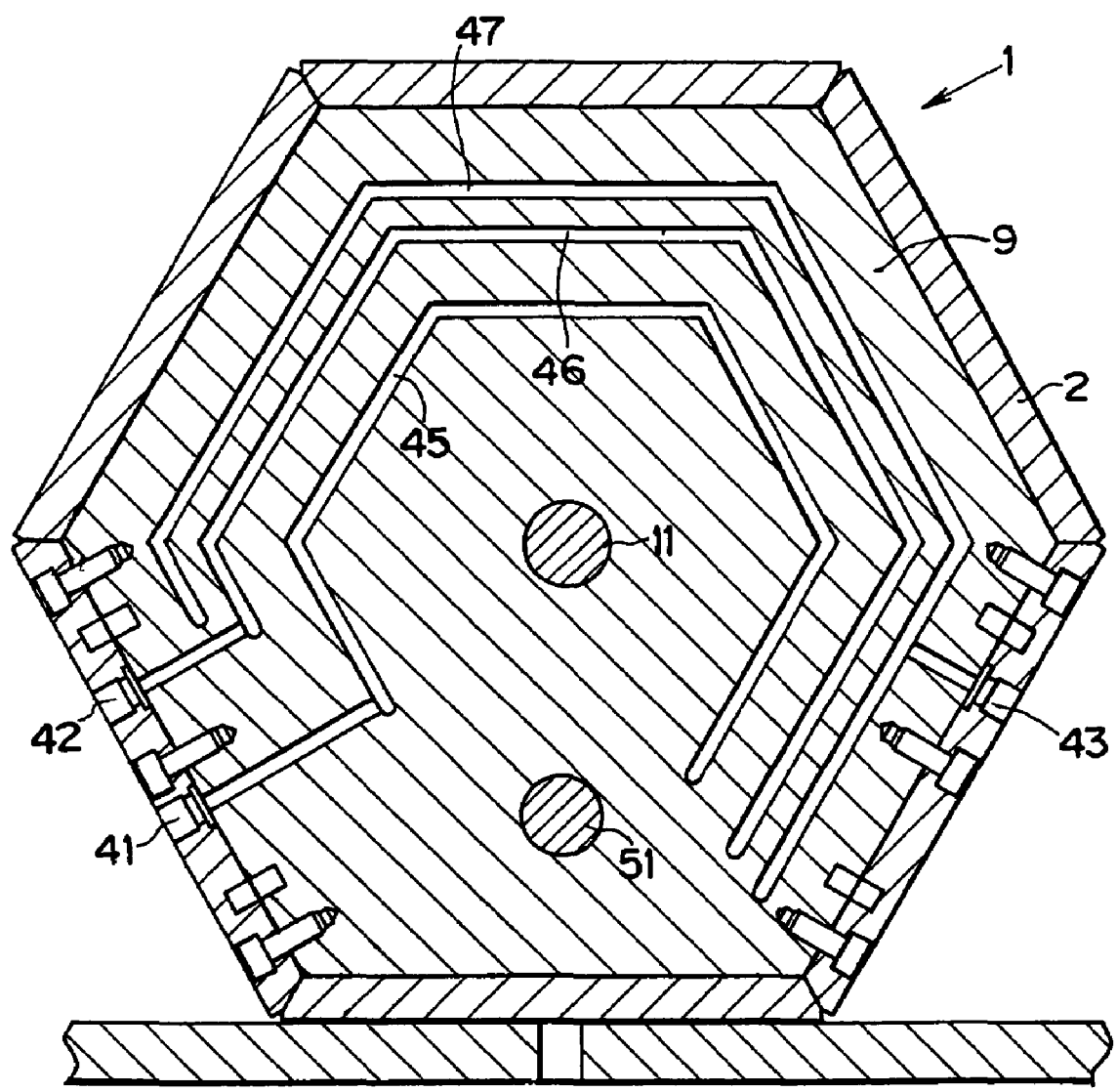
FIG. 4 is a partially omitted sectional view showing a configuration of oil passages formed on a intermediate plate corresponds to a wall portion of the present invention.
Figure 5:
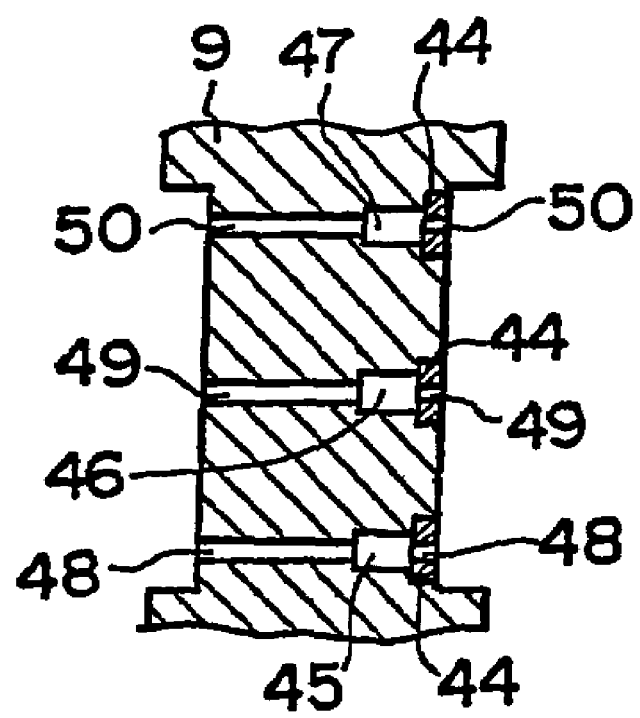
FIG. 5 is a sectional closeup of V portion of FIG. 1.

An oil passage for feeding and draining the oil pressure to the hydraulic cylinder 33 is formed on the intermediate plate 9. Namely, there are three grooves formed on one of the faces of the intermediate plate 9 (i.e., right side face in FIG. 1) generally in parallel with the five sides except the bottom side, and the end portions of the inner groove and the intermediate groove in the left side of the FIG. 4 lead to inner face of the housing 2 and communicate with ports 41 and 42 formed on the exterior wall of the housing 2. Also, the proximity of the end portion of the outer groove in the right hand side of FIG. 2 leads to the inner face of the housing 2, and communicated with a port 43 formed on the exterior wall of the housing 2. Moreover, a strip-shaped plug 44 is installed on the opening of those grooves as depicted in FIG. 5. In consequence, each groove is constructed as the oil passages 45, 46, and 47.

Portions distant from 120 degrees each at the center angle of both left and right side of said intermediate plate 9 function as installation faces for fixing the hydraulic cylinder 33, and ports 48, 49 and 50 to be communicated with said each oil passages are formed on the corresponding positions of those installation faces. Namely, as depicted in FIG. 5, each port 48, 49, and 50 are formed by means of boring a hole in a thickness direction from the bottom portion of each groove in respect of the left side face of the intermediate plate 9 in the figure, and by means of boring a hole on the plug 44 in respect of the right side face of the intermediate plate 9 in the figure. Positions of those ports 48, 49, and 50 correspond to the positions of the ports 38, 39, and 40 of each hydraulic cylinders 33 one on one, and each ports 38, 39, 40, 48, 49 and 50 are therefore communicated in consequence of fixing the hydraulic cylinders 33 on the predetermined position of the intermediate plate 9. Accordingly, the inner oil passage 45 functions as a reverse oil passage for drawing the piston backward; the intermediate oil passage 46 functions as a forward oil passage for moving the piston forward; and the outer oil passage 47 functions as a lubricating oil passage for feeding a lubrication oil.

An intermediate shaft 51 is arranged underneath the aforementioned discs 15, 16, 23 and 25 in parallel with the output shaft 11. The intermediate shaft 51 penetrates the intermediate plate 9 and the supporting plate 10. Both of its end portions are held by each end plate 3 and 6 though a bearing 52, and its intermediate portion is held by the intermediate plate 9 through a bearing 53. Also, the input shaft 4 and the intermediate shaft 51 are connected through a pair of gears 54 and 55. Moreover, the intermediate shaft 51 and each input disc 16 and 23 are connected through the input gear 21 integrated with those discs 16 and 23, and a gear 56 to be engaged with the gear 21. Furthermore, the intermediate shaft 51 and the cylindrical shaft 7 are connected through the other pair of gears 57 and 58.

Next, the actions of the aforementioned continuously variable transmission 1 will be described hereinafter. When the input shaft 4 is connected to a power source such as a not shown engine or the like and driven, the torque is transmitted to the intermediate shaft 51 via the pair of gears 54 and 55, and the intermediate shaft 51 is rotated. Then, the torque is transmitted to a gear 21 from the intermediate shaft 51 via a gear 56. The input gear 21 is integrated with the input disc 23 in the right hand side of FIG. 1, and connected to the other input disc 16 by its boss portion 22, so that the first input disc 16 and the second input disc 23 are rotated integrally with the input gear 21.

Those discs 16 and 23 clamp the power rollers 29 and 30 together with those counterparts such as the output discs 15 and 25, therefore, the torque is transmitted to the output discs 15 and 25 from the input discs 16 and 23 via the power rollers 29 and 30, and the output discs 15 and 25 are rotated. In addition, the rotative direction of the output discs 15 and 25 are opposite to the rotative direction of the input discs 16 and 23. Accordingly, the torque is outputted from the output shaft 11 on which the output discs 15 and 25 are mounted thereon.

Thus, transmission of the torque to the output shaft 11 from the input shaft 4 is executed though the discs 15, 16, 23 and 25 which clamp the power rollers 29 and 30; therefore, the transmittable torque is limited according to the clamping force of those discs. Hence, the oil pressure corresponding to the torque to be transmitted is fed to the hydraulic chamber 27 located on the back side of the second output disc 25, and the contact pressures between each discs 15, 16, 23 and 25 and the power rollers 29 and 30 are maintained as the pressure corresponding to the torque to be transmitted.

If the oil pressure is fed from the port 41 formed on the exterior wall of the housing 2 when each discs 15, 16, 23 and 25 are rotating, the oil pressure is fed to the hydraulic chamber located in front of the piston of each hydraulic cylinder 33 via the reverse oil passage 45, and the piston and the piston rod 34 integrated with the piston is drawn backward. On the contrary, if the oil pressure is fed from the port 42 formed on the exterior wall of the housing 2, the oil pressure is fed to the hydraulic chamber located behind the piston of each hydraulic cylinder 33 via the forward oil passage 46, and the piston and the piston rod 34 integrated with the piston is moved forward.

The power rollers 29 and 30 are transferred on the rolling face together with the carriage 31 in accordance with such movement of the piston rod 34 forward and backward. Consequently, the crossed axis angle of the plane along the radial direction of the discs 15, 16, 23 and 25 passes through the contact portion of the power rollers 29 and 30 and the discs 15, 16, 23 and 25, and the rolling faces of the power rollers 29 and 30 becomes larger or smaller than 90 degrees, and the status becomes so-called inclined status accordingly. As a result, the load to incline the rolling face of the power rollers 29 and 30 in sideways (i.e., side slip force) is acted on the power rollers 29 and 30, and the radial position of the contact portion against the input discs 16 and 21, i.e., measurement from the center axis of the output shaft 11 and the radial position of the contact portion against the output discs 15 and 25, i.e., the measurement from the center axis from the output shaft 11 are to be differed. Consequently, the gear ratio which corresponds to the proportion of those measurements is set.

Transmission of the torque in the aforementioned continuously variable transmission 1 is executed with utilizing a shearing force of an oil film formed between each disc 15, 16, 23 and 25 and the power roller 29 and 30, likewise the continuously variable transmission according to the prior art. For that purpose, the lubricating oil is fed to the contact portions between each disc 15, 16, 23 and 25, and the power roller 29 and 30 by means of feeding the lubricating oil with pressurizing to the port 43 formed on the exterior wall of the housing 2. Namely, the lubricating oil fed to the port 43 is then fed to a lubrication port 40 of each hydraulic cylinder 33 via the lubricating oil passage 47 with being distributed. After that, the lubricating oil enters into the lubrication oil passage 36 of the shaft portion 32 from the rear end portion of the piston rod 34, and blown to the outer circumferential face of the power rollers 29 and 30 from the opening of the leading end portion of the lubrication oil passage 36. The lubricating oil thus adheres on the power rollers 29 and 30 is fed to the contact portions with the discs 15, 16, 23 and 25 by means of the rotation of the power rollers 29 and 30, and the oil film is formed accordingly.

In the continuously variable transmission thus far described according to the present invention, the hydraulic cylinder 33 (i.e., an actuator) for the power roller arranged with being protruded outwardly in the radial direction against the discs 15, 16, 23 and 25 is held with being fixed on the both sides faces of the intermediate plate 9 which functions as a wall portion provided on the inner face of the housing 2 in a protruding condition. Therefore, it is unnecessary for the housing 2 to be formed a protrusion on its exterior portion, and the entire profile of the continuously variable transmission 1 may be simplified as being almost cylindrical. Accordingly, manufacturing of the housing 2 and the continuously variable transmission 1 with employing such a housing becomes easy, and the mountability of the continuously variable transmission 1 becomes preferable when it is mounted on a vehicle.

Moreover, oil passages for controlling and for the lubricating oil are easy to be constructed and hydraulic equipments for the oil passage are easy to be connected, because, in the aforementioned continuously variable transmission 1, the oil passages are formed on the portion constructing the housing 2, and the oil passages are connected by means of fixing the hydraulic cylinder 33 on the intermediate plate 9.

Here, this invention should not be limited to the specific embodiments thus far described, but the input discs 29 and 30 are may be constructed to be held directly and rotatably at the outer circumferential face of the input discs, instead of to be held by fitting a bearing on its boss portion. Furthermore, the actuator for moving a power roller backward and forward according to the invention is not limited in the hydraulic type, but the electric motor driven type and the one combined with a link mechanism may also be employed.

Here will be synthetically described the advantages to be attained by this invention. According to the present invention, as has been described hereinbefore, portions protruding outward on the housing are eliminated or decreased, because the actuator for moving the roller clamped between the discs backward and forward is fixed to the installation portion provided on the inner face of the housing with protruding toward the center portion, or to the wall portion. Therefore, portions protruding outwardly are eliminated or decreased, and as a result, the entire profile of continuously variable transmission may be simplified and the housing may be manufactured easily. Accordingly, the productivity of entire continuously variable transmission may be improved. Moreover, mountability for the vehicle may be preferable in case of constructed as a continuously variable transmission to be mounted on the vehicle.

Also, according to the present invention, it is unnecessary to arrange pipelines for feeding and draining hydraulic pressure, because the oil passage for feeding and draining the oil pressure to the hydraulic type actuators is formed on the wall portion integrated with the housing, and the actuator may be connected to the oil passage by means of installing the actuator on the wall portion. Accordingly, the construction of the continuously variable transmission as a whole may be simplified or downsized, and the oil passages may be arranged inside of the housing or the wall portion when they are manufactured; therefore, manufacturing and assembly of the continuously variable transmission may be easy.

INDUSTRIAL APPLICABILITY

This invention can be utilized in the field for manufacturing the continuously variable transmission and in the field for using the continuously variable transmission. Especially, this invention can be utilized in the field relating to an automobile having the continuously variable transmission mounted thereon.

The invention claimed is:

1. A continuously variable transmission having two sets of input and output discs, wherein a roller is clamped in a rotatable condition by each set of discs arranged rotatably on a common axis and opposed to each other; wherein an actuator for moving each roller backward and forward in a direction along a plane vertical to a center axis of rotation of the discs is provided; and wherein each of said discs, rollers, and actuators are accommodated inside of a housing, comprising:

an installation portion constructed of a wall portion leading to a center portion of said housing and located in a space separating the two sets of discs;

wherein said actuators are fixed to said wall portion at a side face of the actuators;

wherein said actuators are operated by oil pressure, and a port for conducting the oil pressure is formed by an opening on an installation face against a side face of said wall portion;

wherein an oil passage is formed inside of said wall portion, and the oil passage comprises another port to be communicated with the port of said actuators with the opening to said side face; and wherein said actuators move backward and forward linearly, and said installation face inclines to a linear moving direction of the actuators with predetermined degrees.

2. A continuously variable transmission as set forth in claim 1, characterized:

in that another port to be communicated with the oil passage formed inside of said wall portion is formed on an exterior wall portion for constructing said housing.

3. A continuously variable transmission having two sets of input and output discs, wherein a roller is clamped in a rotatable condition by each set of discs arranged rotatably on a common axis and opposed to each other; wherein an actuator for moving each roller backward and forward in a direction along a plane vertical to a center axis of rotation of the discs is provided; and wherein each of said disc, rollers, and actuators are accommodated inside of a housing, comprising:

an installation portion located in a space separating the two sets of discs; and wherein said actuators are fixed to two side surfaces of the installation portion.

4. A continuously variable transmission as set forth in claim 3, wherein:

the installation portion protrudes to a center portion of the housing on an inner face of the housing.

5. A continuously variable transmission as set forth in claim 3, wherein:

said actuators are operated by oil pressure, and a port for conducting the oil pressure is formed by an opening on an installation face of said installation portion; and an oil passage is formed on said housing and the installation portion, and the oil passage comprises another port to be communicated with the port of said actuators, with the opening to said installation portion.

6. A continuously variable transmission as set forth in claim 3, wherein:

said actuators are operated by oil pressure, and a port for conducting the oil pressure is formed by an opening on an installation face against a side face of said wall portion; and an oil passage is formed inside of said wall portion, and the oil passage comprises another port to be communicated with the port of said actuators, with the opening to said side face.

7. A continuously variable transmission as set forth in claim 6, wherein another port to be communicated with the oil passage formed inside of said wall portion is formed on an exterior wall portion for constructing said housing.

* * * * *